Feb. 19, 1952          J. M. DORTON          2,586,012
ADJUSTABLE VEHICLE SEAT
Filed March 19, 1947          2 SHEETS—SHEET 1
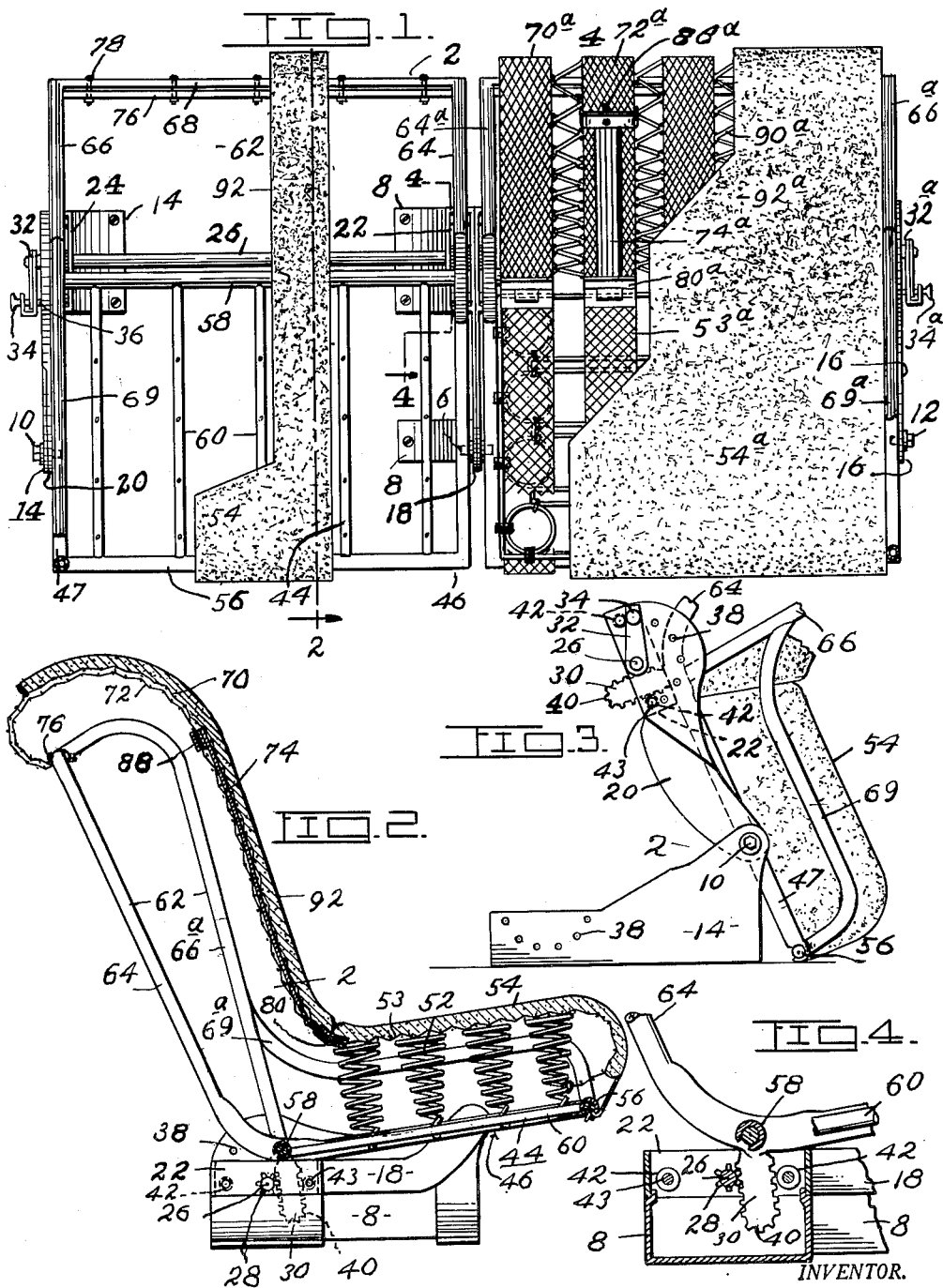
INVENTOR.
John M. Dorton,
BY
F. G. Fischer,
Atty.

Feb. 19, 1952 J. M. DORTON 2,586,012
ADJUSTABLE VEHICLE SEAT
Filed March 19, 1947 2 SHEETS—SHEET 2
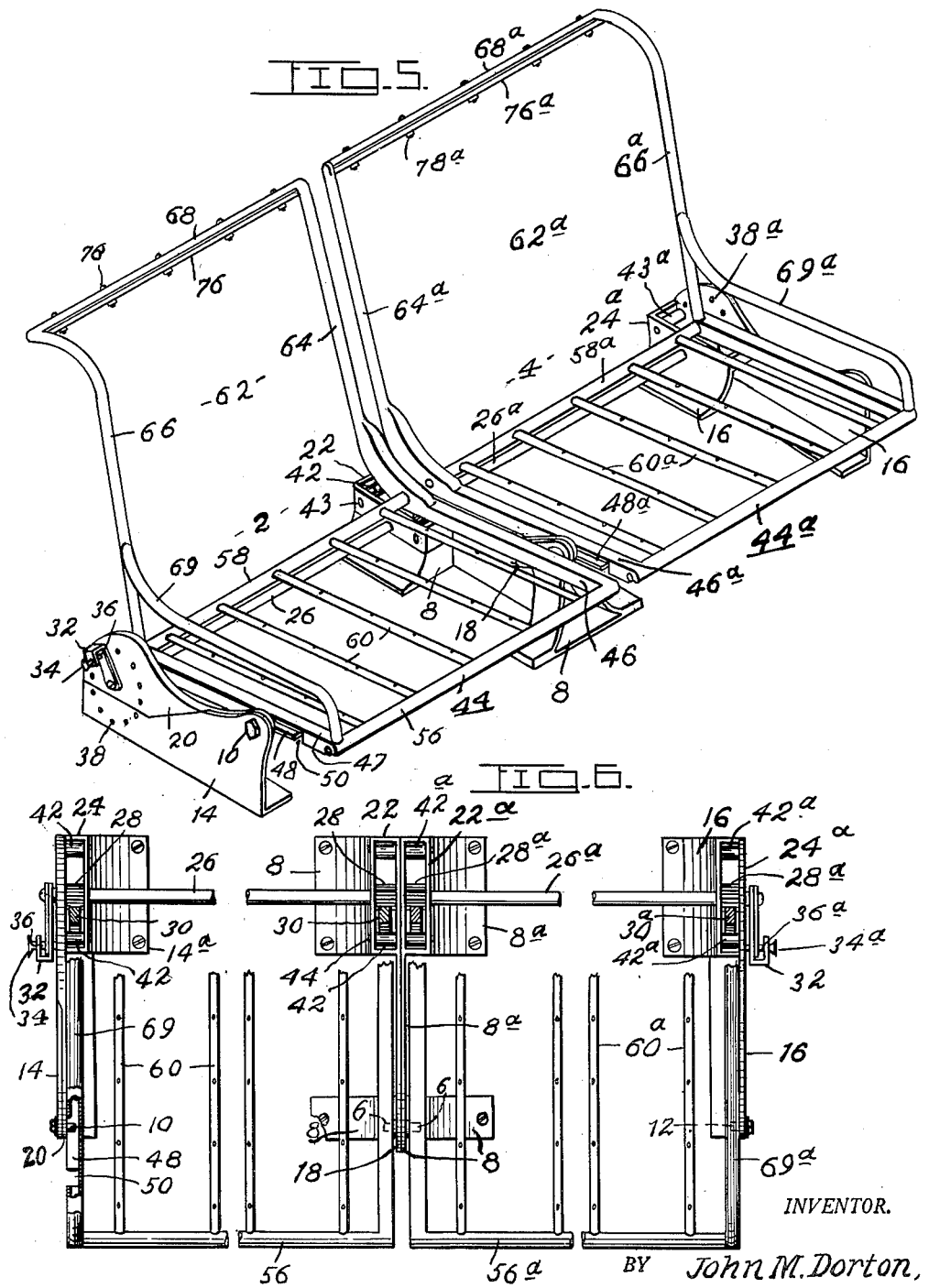
INVENTOR.
BY John M. Dorton,
By F. G. Fischer
Atty.

Patented Feb. 19, 1952

2,586,012

UNITED STATES PATENT OFFICE 2,586,012

ADJUSTABLE VEHICLE SEAT

John M. Dorton, Bonner Springs, Kans.

Application March 19, 1947, Serial No. 735,566

5 Claims. (Cl. 155—5)

My invention relates to vehicle seat structures for use in automotive vehicles, airplanes, railway cars and other passenger carrying vehicles. One object of the invention is the provision of two seats adapted to be placed side by side in a motor vehicle, one seat to be used by a passenger and the other by the driver of the motor vehicle.

Another object of the invention is to provide a passenger seat and supporting means therefor which may be swung upward and forward out of the way of passengers entering or leaving the rear seat of the motor vehicle.

Another object is to provide two seat structures which will provide a comfortable support for a third person seated between the passenger and the driver.

A further object is to provide the seat structures with back cushioning means supported by stiff frame members, which latter are so spaced to the rear of the cushioning means as to prevent contact with the back of the third person when seated between the passenger and the driver.

Another object is to provide means for adjusting the seat structures forward or backward or upward or downward to a limited extent for the convenience of persons of different heights and mounting the forward portion of the seat structures on pivotal means, those for the driver's seat being so located below the steering wheel of the vehicle that the relative position of the driver's seat with respect to the steering wheel will not vary sufficiently to inconvenience the driver.

Other objects will hereinafter appear, and in order that the invention may be fully understood reference will now be had to the accompanying drawings, in which:

Fig. 1 is a plan view of both seat structures with some parts removed.

Fig. 2 is a vertical sectional view on line 2, of Fig. 1.

Fig. 3 is a broken side elevation of the driver's seat structure swung forward and upward.

Fig. 4 is an enlarged broken side elevation, partly in section, of one seat structure.

Fig. 5 is a perspective view showing the seat and back frames of both seat structures.

Fig. 6 is an enlarged broken plan view of the seat frames.

Referring in detail to the various parts constituting the invention, 2 and 4 designate two seat structures which may be employed to advantage as front seats for an automobile. When thus employed the seat structures are arranged side by side, the seat 2 being intended for a passenger, and the seat 4 for the driver of the automobile. Adjacent sides of the seat structures 2 and 4 are swingably mounted upon a common support comprising a trunnion 6 extending through a central supporting member 8 adapted to be secured to the floor of the automobile. The distal sides of the seat structures 2 and 4 are mounted upon trunnions 10 and 12, alined axially with the trunnion 6 and fixed to supporting members 14 and 16, respectively, adapted to be secured to the floor. The upper margin of the supporting member 14 slopes toward its rear end so that rear seat passengers are not likely to trip over said supporting members when gaining access to or leaving the rear seat of the automobile.

Two swingable members 18 and 20 are pivotally mounted at their forward ends upon the trunnions 6 and 10 and provided at their rear ends with bearings 22 and 24, adapted to rest upon the supporting members 8 and 14, respectively, when the swingable members are in lowered position. A shaft 26 is journaled in the ends of the swingable members 18 and 20 and the bearings 22 and 24, respectively. The shaft 26 is provided with two fixedly mounted pinions 28 adapted to intermesh with racks 30 depending from the lower rear portion of the seat structure 2. One end of the shaft 26 projects from the rear side of the swingable member 20 and is provided with a manually controlled crank 32 fixed at one end upon the shaft 26 and provided at its opposite end with a knob 34 carrying a spring-pressed detent 36 adapted to enter any one of a circular series of holes 38 to secure the crank 32 for accidental movement. Some of the holes 38 are in the supporting member 14 and the remainder are in the enlarged rear end of the swingable member 20. From the foregoing it will be understood that the passenger seat structure 2 may be locked down in normal position when the pinions 28 and racks 30 are intermeshed and the detent 36 is entered in one of the holes 38 in the supporting member 14, or by turning the crank 32 and entering the detent 36 in one of the holes 38 in the swingable member 20, the latter, together with the swingable member 18, shaft 26, crank 32, pinions 28 and racks 30 may be swung upward and forward with the rear end of the seat structure 2 in order to be out of the way of passengers when entering or leaving the rear seat of the automobile.

When desired the rear end of the passenger seat structure 2 may be swung upward and forward independently of the swingable members 18 and 20 and the shaft 26, by disengaging the detent 36 from the swingable member 20 and turning the crank 32 until the racks 30 have been moved to the top of the pinions 28, from which position the racks may be swung with the seat structure 2. Referring further to the pinions and racks 28 and 30, respectively, each rack 30 extends downward from a rear corner of a rectangular seat frame, hereinafter described, and has a series of teeth 40 which extends around the bottom and upwardly on the front and rear sides of the rack, which latter is normally held in mesh with the associated pinion 28 by guide rollers 42, spaced from opposite sides of the pinion. With the foregoing arrangement of racks and pinions the seat structure 2 may be adjusted rearwardly by rotating the pinions 28 in one direction, or forwardly by rotating the pinions in a reverse direction, or the rear end of the seat structure may be raised or lowered by adjusting the racks 30 up or down by the pinions 28. The rollers 42 have spindles 43 mounted at their opposite ends in the swingable members 18 and 20 and the bearings 22 and 24, respectively.

As disclosed by Figs. 1, 5 and 6, the seat structure 2 is provided with the rectangular seat frame 44, above referred to, which has oppositely disposed side members 46 and 47, each of which has a short slot 48 in one side that communicates at its forward end with an aperture 50, in the bottom of said side member to permit removal of the seat structure 2 from the trunnions 6 and 10 after the racks 30 have been adjusted to the top of the respective pinions 28, as hereinbefore described. The rectangular seat frame 44 is provided with cushioning means 52 including woven wire strips 53, with upholstery 54. The ends of the side members 46 and 47 of the seat frame 44 are united by front and rear frame members 56 and 58, respectively, and the cushioning means 52 is supported upon spaced intermediate members 60 secured at their ends to said front and rear members 56 and 58.

The rear end of the seat frame 44 is provided with a back frame 62, comprising back members 64 and 66, united at their upper ends by a transverse member 68. The back member 64 curves upwardly and rearwardly from the seat frame 44 and is fixed at its upper end to the adjacent end of the transverse top member 68. The back member 66 is fixed at its lower end to the rear end of the seat member 47 and extends upwardly and curves rearwardly at its upper end to the other end of the transverse member 68, to which it is fixed. An arm 69 is secured at one end to the seat member 47 and at its opposite end to the back member 66 to reinforce the latter.

The back frame 62 is provided with cushioning means comprising woven wire strips 70, reinforced at their rear sides with similar woven wire strips 72 and trusses 74. The wire strips 70 and 72 are firmly secured at their upper ends between the transverse member 68 and a clamping bar 76, which latter is removably secured to the transverse member by elements 78. The lower ends of the woven wire strips 70 and 72 are connected to the woven wire strips 53 of the seat frame 44 by hinges 80. Each truss 74 comprises a plurality of parallel wires 82 arranged side by side and welded or otherwise appropriately united at their upper and lower ends, the former of which has a flexible clip 88, the ends of which are adapted to be folded around the longitudinal margins and against the back of the associated wire strip 72. The lower end of the truss is secured to the associated hinge 80. The woven wire strips 70 and 72 and the trusses 74 are curved longitudinally to fit the curvature of the back of the passenger when occupying the seat structure. Wire strands 90 are woven in zigzag style through the adjacent longitudinal margins of the woven wire strips 70 to prevent lateral displacement of the latter when subjected to pressure by the back of the passenger. Upholstery 92 is provided to cover the wire strips 78, to which it is secured in any approved manner.

The driver's seat structure 4 is approximately a duplicate of the passenger seat structure 2, as evidenced by corresponding reference numerals with exponents a, applied to most of the parts constituting said seat structure 4. As rear seat passengers seldom enter or leave an automobile at the side adjacent to the driver's seat structure, I consider it unnecessary to provide swingable members to move the shaft 26a out of the way and have shown the ends of the shaft journaled in the stationary bearings 22a and 24a, respectively. I have also shown the rear end of the supporting member 16 enlarged and provided with a circular series of holes 38a to receive the detent 36a, which coacts with the pinions and racks 28 and 30, respectively, in locking the seat structure 4 in normal position or whereby the seat structure 4 may be adjusted forward or backward or upward or downward in the same manner as the seat structure 2.

From the foregoing description taken in connection with the accompanying drawings, it will be understood that I have provided two seat structures which can be readily adjusted to various positions independently of each other and when placed side by side will accommodate two passengers and a driver. Also that the adjacent sides of the seat structures are mounted upon the single trunnion 6, fixed to the forward end of the single member 8, thereby effecting a saving in the cost of labor and material.

From the foregoing description taken in connection with the accompanying drawings, it is apparent that I have provided seat structures possessing the advantages hereinbefore mentioned, and while I have shown a preferred form of the seat structures, I reserve all rights to such changes and modifications as properly fall within the scope of the invention as claimed.

Having thus described my invention, what I claim and desire to secure by Letters Patent, is:

1. In combination, a seat structure, supporting means upon which the seat structure is swingably mounted, swingable members operably mounted upon the supporting means and arranged at opposite sides of the seat structure, a shaft journaled in the rear portions of the swingable members, coacting means on the seat structure and the shaft whereby they may be connected to swing together or disconnected to permit the seat structure to swing independently of said shaft, and manually controlled means mounted upon the shaft and adapted to actuate said coacting means.

2. In combination, a seat structure, supporting means upon which the seat structure is pivotally mounted on a horizontal transverse axis adjacent the forward edge of the seat, a swingable member disposed at each side of the seat structure and extending forwardly and rearwardly, said swingable members being pivoted at their forward ends to said supporting means, a horizontal transverse shaft journaled in the rearward portions of the swingable members, releasable means for joining said shaft and said seat structure, and manually controlled means mounted on said shaft and operable to release or engage said releasable means.

3. In combination, a seat structure, supporting means upon which the seat structure is pivotally mounted on a horizontal transverse axis adjacent the forward edge of the seat, a swingable member disposed at each side of the seat structure and extending forwardly and rearwardly, said swingable members being pivoted at their forward ends to said supporting means, a horizontal transverse shaft journaled in the rearward portions of the swingable members, pinions fixed to the shaft, racks depending from the seat structure and intermeshing with said pinions, a manually controlled crank fixed on the shaft, and spring-pressed means mounted on the crank adapted to engage the supporting means when the crank is turned to one position, or to engage one of the swingable members when the crank is turned to another position.

4. In combination, a seat structure comprising a seat frame having an outwardly opening slot in its opposite sides, said slots extending forwardly and rearwardly, supporting means adjacent opposite sides of the seat frame and including axially alined trunnions engaging said slots whereby said seat frame is swingable about a horizontal transverse axis adjacent the forward edge thereof, a swingable member pivoted at its forward end on each of said trunnions and extending rearwardly therefrom, a horizontal transverse shaft journaled in the rearward end portions of said swingable members, pinions fixed on said shaft, racks fixed to and depending from said seat frame and intermeshing with said pinions, said racks being so formed that when said shaft is turned the rearward edge of said seat frame will be moved vertically and said seat frame will be moved forwardly or rearwardly on said trunnions, a manually operable crank fixed to said shaft, and spring-pressed means mounted on said crank and adapted to engage selectively any of a circular series of holes concentric with said shaft, a portion of said holes being formed in one of said swingable members and the remainder of said holes being formed in the adjacent supporting means.

5. In combination, a seat structure comprising a seat frame having an outwardly opening slot in its opposite sides, said slots extending forwardly and rearwardly, supporting means adjacent opposite sides of the seat frame and including axially alined trunnions engaging said slots whereby said seat frame is swingable about a horizontal transverse axis adjacent the forward edge thereof, a swingable member pivoted at its forward end on each of said trunnions and extending rearwardly therefrom, a horizontal transverse shaft journaled in the rearward end portions of said swingable members, pinions fixed on said shaft, racks fixed to and depending from said seat frame and intermeshing with said pinions, said racks being formed with teeth extending along the forward and rearward edges thereof and around the lower end thereof, whereby as said shaft is turned the rearward edge of the seat frame will be swung upwardly or downwardly and said seat frame will be moved forwardly or rearwardly on said trunnions, guides carried by said swingable members and holding said racks in engagement with said pinions when said pinions are in engagement with the forward or rearward edges of said racks, a crank fixed to said crank and adapted to engage selectively a circular series of holes concentric with said shaft, a part of said holes being formed in one of said swingable members and the remainder of said holes being formed in the adjacent supporting means.

JOHN M. DORTON.

REFERENCES CITED

The following references are of record in the file of this patent:

UNITED STATES PATENTS

| Number | Name | Date |
| --- | --- | --- |
| 1,587,216 | Collins | June 1, 1926 |
| 1,929,024 | Ingle | Oct. 3, 1933 |
| 1,938,435 | McAllister | Dec. 5, 1933 |
| 1,957,004 | Smith | May 1, 1934 |
| 2,005,112 | Smelker | June 18, 1935 |
| 2,165,306 | Shanahan | July 11, 1939 |
| 2,421,851 | Rivard et al. | June 10, 1947 |